(12) United States Patent
Batsch-Smith

(10) Patent No.: US 10,753,287 B2
(45) Date of Patent: Aug. 25, 2020

(54) ACTIVE INLET TURBINE CONTROL

(71) Applicant: Mitsubishi Hitachi Power Systems Americas, Inc., Lake Mary, FL (US)

(72) Inventor: Lisa Batsch-Smith, Orlando, FL (US)

(73) Assignee: Mitsubishi Hitachi Power Systems Americas, Inc., Lake Mary, FL (US)

( * ) Notice: Subject to any disclaimer, the term of this patent is extended or adjusted under 35 U.S.C. 154(b) by 203 days.

(21) Appl. No.: 16/053,214

(22) Filed: Aug. 2, 2018

(65) Prior Publication Data

US 2020/0040823 A1 Feb. 6, 2020

(51) Int. Cl.
*F02C 9/18* (2006.01)

(52) U.S. Cl.
CPC .......... *F02C 9/18* (2013.01); *F05D 2240/128* (2013.01); *F05D 2270/303* (2013.01); *F05D 2270/54* (2013.01); *F05D 2270/8041* (2013.01)

(58) Field of Classification Search
CPC ................ F02C 9/18; F05D 2240/128; F05D 2270/303; F05D 2270/54; F05D 2270/804
USPC ............................................................. 415/1
See application file for complete search history.

(56) References Cited

U.S. PATENT DOCUMENTS

| | | | | |
|---|---|---|---|---|
| 4,783,026 A | | 11/1988 | Rumford | |
| 4,872,807 A | * | 10/1989 | Thompson | F01D 17/08 415/118 |
| 5,165,844 A | * | 11/1992 | Khalid | F01D 11/20 415/17 |
| 5,168,699 A | * | 12/1992 | McCarty | F02C 7/266 60/39.091 |
| 5,448,881 A | * | 9/1995 | Patterson | F02C 7/057 415/26 |
| 5,560,195 A | | 10/1996 | Anderson et al. | |
| 6,386,755 B1 | * | 5/2002 | Draxton | G01K 11/24 374/117 |
| 6,952,639 B2 | * | 10/2005 | Kumar | F01D 17/02 374/101 |
| 7,598,485 B2 | * | 10/2009 | Csutak | E21B 47/06 250/265 |
| 7,761,216 B2 | * | 7/2010 | Norris | F02D 41/1498 701/100 |
| 8,083,466 B2 | | 12/2011 | Zhang et al. | |
| 8,844,258 B2 | | 9/2014 | Ekanayake et al. | |
| 9,556,791 B2 | * | 1/2017 | DeSilva | G01M 15/14 |
| 2004/0148940 A1 | * | 8/2004 | Venkateswaran | F01D 17/085 60/772 |
| 2011/0154821 A1 | * | 6/2011 | Evans-Beauchamp | F02B 39/16 60/615 |
| 2012/0150413 A1 | * | 6/2012 | Bunce | F02C 9/28 701/100 |

(Continued)

*Primary Examiner* — J. Todd Newton
(74) *Attorney, Agent, or Firm* — Schwegman Lundberg & Woessner, P.A.

(57) ABSTRACT

Disclosed are systems and methods for active inlet turbine control. The systems and methods may include receiving a plurality of signals, determining a temperature gradient across an inlet of a gas turbine engine, and transmitting an activation signal to a modulating valve. Each of the plurality of signals may correspond to a temperature measured by one of a plurality of sensors located proximate the inlet of the gas turbine engine. The temperature gradient across the inlet of the gas turbine engine may be determined based on the plurality of signals. The activation signal may be operative to open or close the modulating valve based on the temperature gradient.

15 Claims, 4 Drawing Sheets

(56) References Cited

U.S. PATENT DOCUMENTS

| | | | |
|---|---|---|---|
| 2014/0278200 A1* | 9/2014 | DeSilva | G01K 11/26 |
| | | | 702/130 |
| 2015/0075170 A1* | 3/2015 | Scipio | F02C 3/14 |
| | | | 60/772 |
| 2015/0168228 A1* | 6/2015 | DeSilva | G01K 11/24 |
| | | | 374/119 |
| 2015/0168229 A1* | 6/2015 | DeSilva | F01D 17/085 |
| | | | 60/772 |
| 2015/0260612 A1* | 9/2015 | DeSilva | G01K 13/02 |
| | | | 702/48 |
| 2015/0345393 A1 | 12/2015 | Ekanayake et al. | |
| 2016/0131146 A1* | 5/2016 | Zhang | F04D 27/001 |
| | | | 60/805 |
| 2016/0169119 A1* | 6/2016 | Musci | F02C 6/08 |
| | | | 60/782 |
| 2016/0299225 A1* | 10/2016 | DeSilva | G01K 11/24 |
| 2017/0002821 A1* | 1/2017 | Claussen | F04D 29/701 |
| 2017/0176265 A1* | 6/2017 | DeSilva | G01K 7/427 |
| 2017/0218841 A1* | 8/2017 | Nestico | F01D 17/08 |
| 2017/0364043 A1* | 12/2017 | Ganti | G05B 13/048 |
| 2019/0024529 A1* | 1/2019 | Kajihara | F02C 3/04 |

\* cited by examiner

ACTIVE INLET TURBINE CONTROL

BACKGROUND

Gas turbine engines have many uses. For example, gas turbine engines are used to propel vehicles such as aircraft. In addition, gas turbine engines are used to generate electricity that may be used to power homes or other buildings. For example, power plants may use gas turbine engines to spin electrical generators during times of high demand to provide additional electricity when traditional coal tired steam generators are not able to generate enough electrical power to meet demands.

SUMMARY

Disclosed are systems and methods for active inlet turbine control. The systems and methods may include receiving a plurality of signals, determining a temperature gradient across an inlet of a gas turbine engine, and transmitting an activation signal to a modulating valve. Each of the plurality of signals may correspond to a temperature measured by one of a plurality of sensors located proximate the inlet of the gas turbine engine. The temperature gradient across the inlet of the gas turbine engine may be determined based on the plurality of signals. The activation signal may be operative to open or close the modulating valve based on the temperature gradient.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
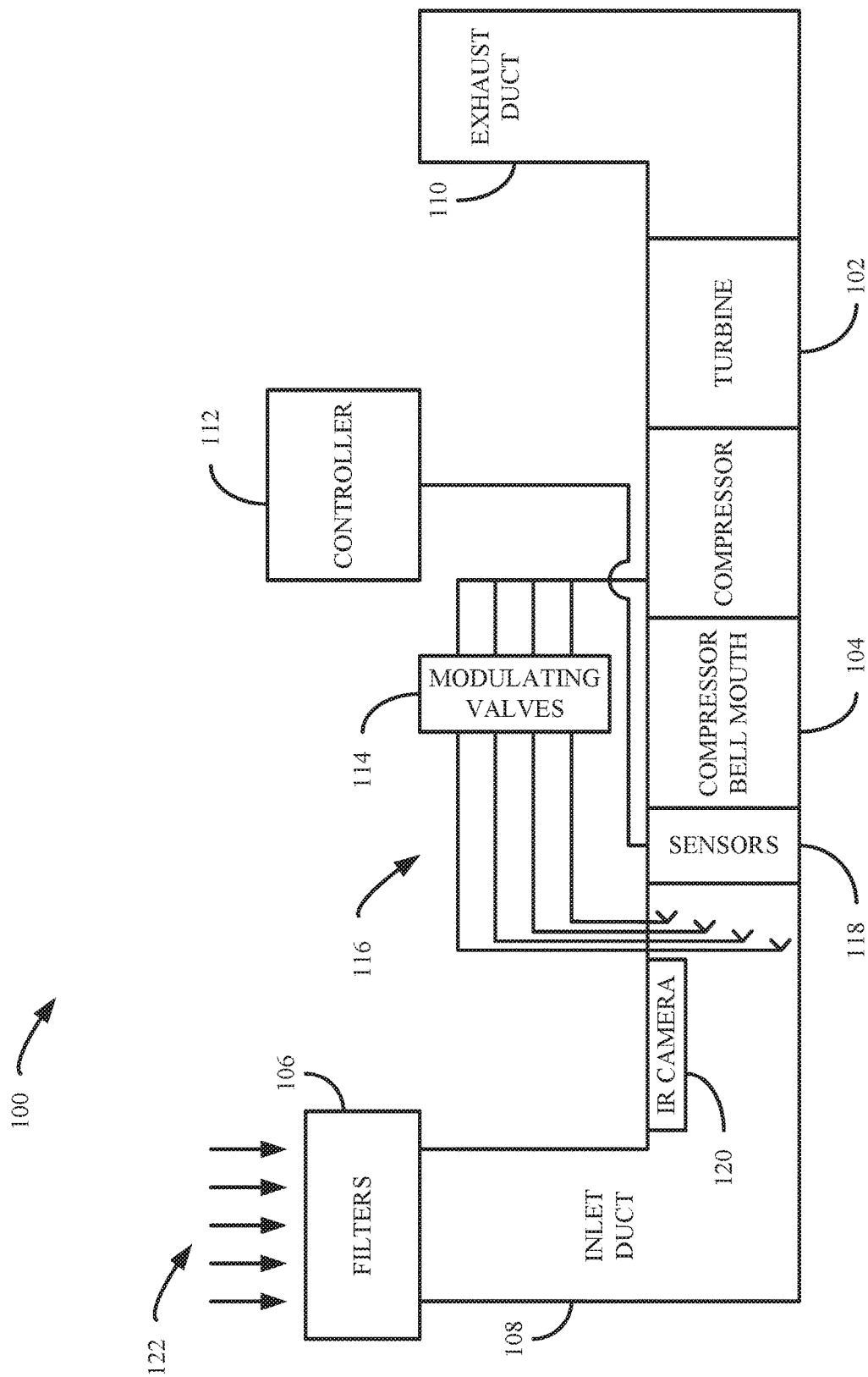
FIG. 1 shows an example schematic of a system for providing active inlet turbine control consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

Operation of a gas turbine engine under certain environmental conditions can lead to the formation of ice, specifically within or upon components of the inlet duct and/or compressor. Formation of ice can be detrimental, as it may modify the geometry of some of the components upon which it may form thereby altering air flow characteristics of the gas turbine, and can impact and damage other components if it becomes dislodged.

Heated compressor air may be used to prevent ice formation. For example, a manifold that feeds compressed (and heated) air to one or more sets of tubes that include evenly distributed dispersion nozzles within an inlet duct may be used to prevent ice formation. Heated air may also be introduced from the exhaust. Such recirculated exhaust gas may include reduced levels of oxygen, and also be introduced to beneficially impact additional operational parameters, such as emissions and/or combustion stability. The various arrangements to provide heated compressor and/or exhaust air may result in thermal gradients within the inlet duct.

The heating of gas turbine inlet duct air may be non-uniform due to the airflow through the inlet and nozzles being non-uniform though out the inlet. This non-uniform heating can result in thermal gradients within the inlet duct and lead to localized icing and combustion instability. The systems and methods disclosed herein may increase temperature uniformity within the inlet and further reduction of inlet duct thermal gradients are expected to enhance combustion stability and further reduce emissions.

As disclosed herein, by providing control valves on the anti-icing supply lines, which provide heated air, to control the distribution of the heated air, a uniform inlet temperature distribution may be provided as a solution for gas turbine protection due to icing and minimized CO emissions when utilizing the compressor bleed anti-icing system. To achieve a temperature distribution that is uniform throughout the inlet of the turbine, each of the multiple anti-icing lines may utilize one or more control valves. Temperature acquisition technology such as sensors, infrared technologies, etc. may be used to determine temperatures at the inlet of the turbine. Using the determined temperatures, a geometric mapping of the inlet temperature profile downstream of the anti-icing supply lines may be determined. Feedback of the geometric temperature mapping may provide input to modulate the various control valves in order to provide a reduced thermal gradient (even heating and temperature) throughout the geometry of the inlet duct.

During operation, the inlet duct air flow may not be evenly distributed. For example, the mass airflow may be greater toward the bottom of the inlet duct and less toward the top of the inlet duct. Thus, an arrangement of distribution lines and nozzles as disclosed herein with an accompanying control valve for each distribution line, and downstream temperature measurements that may identify thermal gradients within the inlet duct, may be employed to regulate and help the inlet air so that the air entering the compressor is more thermally uniform. As disclosed herein, a feedback control may modify the amount of air to each distribution line in order to help maintain a more uniform temperature distribution within the duct and at the compressor inlet.

Approaches toward maintaining a uniform temperature distribution may include first modeling the duct airflow. Then different nozzles may be selected for use at various geometric locations within the inlet duct, so that a single supply of heated compressor air may be distributed according to the geometry of the inlet duct resulting in a more uniform temperature distribution.

As disclosed herein, the temperature measurement may be any appropriate arrangement to provide temperature over the geometry of the inlet duct immediately in front of the gas turbine engine. For example, an array of thermocouples may be placed in front of the compressor bell mouth. In another example, a thermal imaging camera may be used to identify the geometric temperature distribution. Other non-contact temperature mapping, such as laser interferometry may be employed to measure the temperature without departing from the scope of this disclosure.

The temperature measurement may be an input to a controller. The controller may then modulate each of the multiple control valves to accordingly modulate the flow of compressor discharge (i.e., heated) air to help with minimizing thermal gradients. The distribution lines may employ various geometric shapes so as to provide optimized response to any gradients determined using the temperature measurements. Computational fluid dynamics may be used to select the most appropriate shaping and locations of the distribution lines as well as appropriate feed-back active control parameters based upon the shape and various airflows within the inlet duct in order to optimize the controllability of thermal gradients arriving at the compressor bell mouth.

As disclosed herein, the distribution lines may be positioned close to the inlet filters and the temperature measurement may be close to the compressor bell mouth. In this way, the increase in amount of travel time/distance of the airflow from the inlet filters to the compressor bell mouth may encourage mixing and homogeneity of the airflow.

The principles disclosed herein may also be used to provide a homogeneous inlet composition, that is to reduce a gradient of the inlet composition within the inlet duct. For example, it will be appreciated that recirculation of exhaust gas may reduce the oxygen content of the inlet air and may be used to control combustion temperature and resultant emissions. Stated another way, as oxygen content is reduced through the use of exhaust gas recirculation, so is the combustion temperature and NOx production. For such an approach, oxygen content may be determinable based upon the sensed temperature of the inlet gas. Also, an arrangement of discrete oxygen sensors may be incorporated to determine oxygen content. This may also be employed with inlet chillers that introduce water, cooler air, or evaporative cooling coils to provide an inlet temperature reduction. Temperature, oxygen, relative and absolute humidity, or other such parameters may be referred to herein as "inlet composition parameters". The exhaust gas, compressor bleed air, water or chilling medium may be referred to generally as a "composition adjustment medium".

As disclosed herein, improved control, leading to reduced thermal gradients at the compressor bell mouth may provide increased confidence of effective anti-icing protection for ice deposition damage, as well as increased confidence in the lack of surge margin reduction due to non-uniform mass flow distribution, and increased combustion stability leading to increased effectiveness of the compressor bleed anti-icing system for CO control.

Turning now to the figures, FIG. 1 shows a schematic of a system 100 for providing active inlet turbine control consistent with this disclosure. System 100 may include a turbine 102, a compressor bell mouth 104, filters 106, an inlet duct 108, an exhaust duct 110, a controller 112, modulating valves 114, bleed lines 116, sensors 118, and an infrared camera 120.

During operation, air 122 may flow through filters 106 so that debris, birds, etc. are filtered from air 122 and are not ingested into system 100. Air 122 may flow from filters 106 and into inlet duct 108. Inlet duct 108 may direct air 122 (either via linear path or non-linear path) to compressor bell mouth 104 where air 122 enters turbine 102 via compressor in a typical manner, as would be appreciated by one of skill in the art. Inlet duct 108 may include nozzles or a diffusor (not shown) to increase or decrease the velocity or pressure of air 122.

As air 122 flows through inlet duct 108 it may pass over sensors 118. Sensors 118 may measure a variety of properties such as, but not limited to, velocity, temperature, humidity, pressure, oxygen content, etc. In another example, infrared camera 120 or other non-contact technology may be used to measure properties of air 122.

Signals from sensors 118 may be transmitted to controller 112. Controller 112 may convert the signals to the various properties. For example, sensors 118 may be thermocouples and the signals may be voltages from each of the thermocouples. Controller 112 may covert the voltages to temperatures using a calibration lookup table or formula.

Figure 2A:
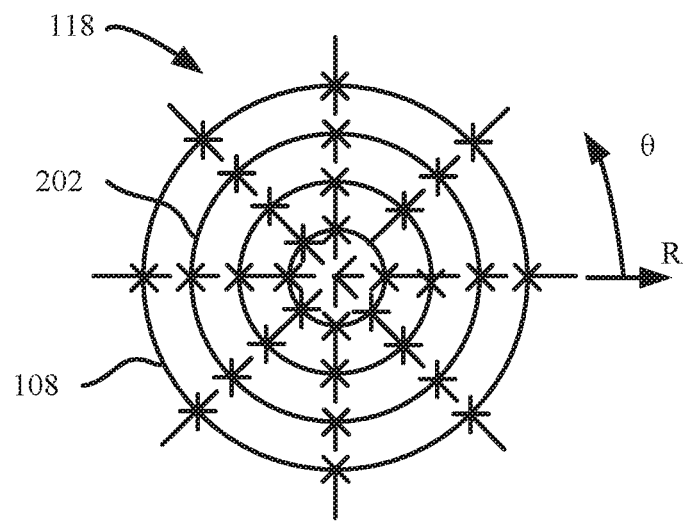
FIGS. 2A and 2B shows grid configurations consistent with this disclosure.
Figure 2B:
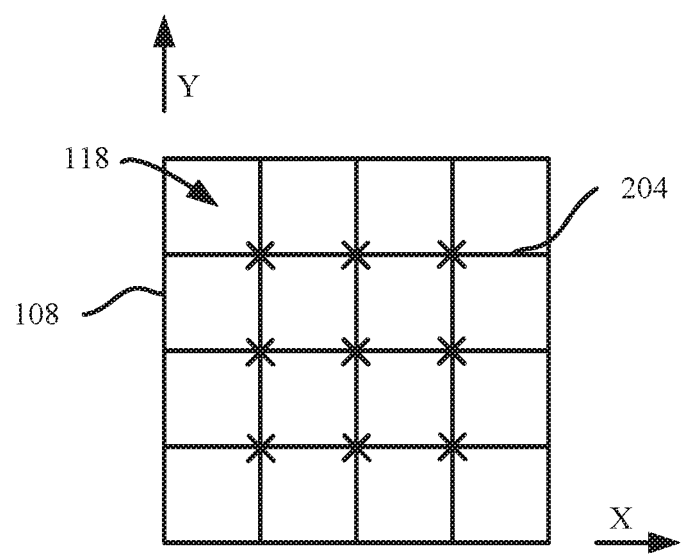

As disclosed herein and shown in greater detail in FIGS. 2A and 2B, sensors 118 may be arranged in various patterns within inlet duct 108. For example, as shown in FIG. 2A, inlet duct 108 may have a circular cross-sectional area and a mesh 202 may be place within inlet duct 108. Sensors 118 may be attached to mesh 202 so as to measure temperature or other properties at various locations. Mesh 202 may be constructed of a thin wire or other material that may be shaped to minimize airflow disturbances within inlet duct 108 as air 122 flows into compressor bell mouth 104. As shown in FIG. 2A, the layout of sensors 118 may be defined on a polar coordinate grid with various sensors 118 positioned at various radii and angles, θ, compared to the center of inlet duct 108.

As shown in FIG. 2B, inlet duct 108 may have a rectangular cross-sectional area and a mesh 204 may be place within inlet duct 108. Sensors 118 may be attached to mesh 204 so as to measure temperature or other properties at various locations. Mesh 204 may be constructed of a thin wire or other material that may be shaped to minimize airflow disturbances within inlet duct 108 as air 122 flows into compressor bell mouth 104. As shown in FIG. 2B, the layout of sensors 118 may be defined on a Cartesian coordinate grid with various sensors 118 positioned at various distances along the X and Y axes with respect to an origin of inlet duct 108.

While FIGS. 2A and 2B show sensors 118 distributed uniformly within inlet duct 108, sensors 118 need not be distributed uniformly within inlet duct 108. For example, a temperature gradient with inlet duct 108 may not be uniform across the cross-sectional area of inlet duct 108. For instance, along a bottom half of the cross-sectional area of inlet duct 108 the slope of the temperature gradient may be greater than the slope of the gradient in the top half of the cross-sectional area of inlet duct 108. As a result, a greater portion of sensors 118 may be located in the bottom half of the cross-sectional area of inlet duct 108 to better measure and characterize the temperature gradient within inlet duct 108.

As disclosed herein, sensors 118 may be in electrical communication with controller 112 and controller 112 may use signals from sensors 118 to determine a temperature gradient with inlet duct 108. Controller 112 may also be in electrical communication with modulating valves 114. Modulating valves 114 may be solenoid valve or other valves that may be electronically actuated. As a result, controller 112 may transmit activation signals to one or more of modulating valves 114 in response to a determination that a temperature gradient within inlet duct 108 exceeds a preset value. The activation signal may cause one or more of modulating valves 114 to open or close so that heated air may flow though bleed lines 116 and into inlet duct 108.

For example, based upon temperature readings from sensors 118, controller 112 may determine that a temperature between the top and bottom of inlet duct 108 exceeds a preset value (e.g., air 120 is cooler at the top of inlet duct 108 by X degrees). In response to this determination, controller 112 may transmit an activation signal to modulating valves 112 located within the top portion of inlet duct 108 so that a larger portion of bypass air may enter into the top portion of inlet duct 108.

As disclosed herein, the location of bleed lines 116 may coincide with the location of sensors 118. For example, each of sensors 118 may be located downstream and at a same coordinate (e.g., (r,θ) for FIG. 2A or (x,y) for FIG. 2B) within inlet duct 108 of a corresponding nozzle of bleed lines 116. As a result, the location where heated air is injected into airflow within inlet duct 108 corresponds to locations where the temperature gradient exceeds the preset value.

As disclosed herein, during operation, controller 112 may continuously receive signals from sensors 118 and determine temperature gradients within inlet duct 108 on a real-time, or near real-time, bases. Thus, controller 112 may be able to determine the effects of heated air or exhaust gas being injected into inlet duct 108 in real-time, or near real-time, and continuously make adjustments to achieve a more uniform temperature profile for air 122 as it enters compressor bell mouth 104.

By continuously monitoring the temperature gradient, controller 112 is able to compensate for changing environmental conditions. For example, during the day ambient temperatures may change. The changing environmental conditions may necessitate controller 112 adjusting the amount of heated air being directed into inlet duct 108 to achieve a more uniform temperature profile while avoiding adverse conditions such as icing. For example, using the systems and methods disclosed herein, a temperature profile of air 122 entering compressor bell mouth 104 may be maintained such that the maximum variation between the hottest and lowest air temperatures does not exceed, 20° C., 50° C., etc. depending on the environmental conditions and operating parameters of system 100.

While FIG. 1 shows a single set of sensors that are used to determine air temperatures proximate compressor bell mouth 104, multiple sensor arrays may be positioned within inlet duct 108. As a result, temperature gradients at various locations within inlet duct 108 may be determined. Knowledge of temperature gradients within inlet duct 108 may be useful in determining if something within inlet duct 108 is causing a temperature gradient to form. For instance, perhaps a constriction (made by ice forming inside inlet duct 108) is creating choke flow which may create a temperature drop at a given location within inlet duct 108 due to the venturi effect. In addition, head losses and friction proximate the surfaces of inlet duct 108 may cause temperatures of air 122 proximate those surfaces to rise leading to a temperature gradient.

Figure 3:
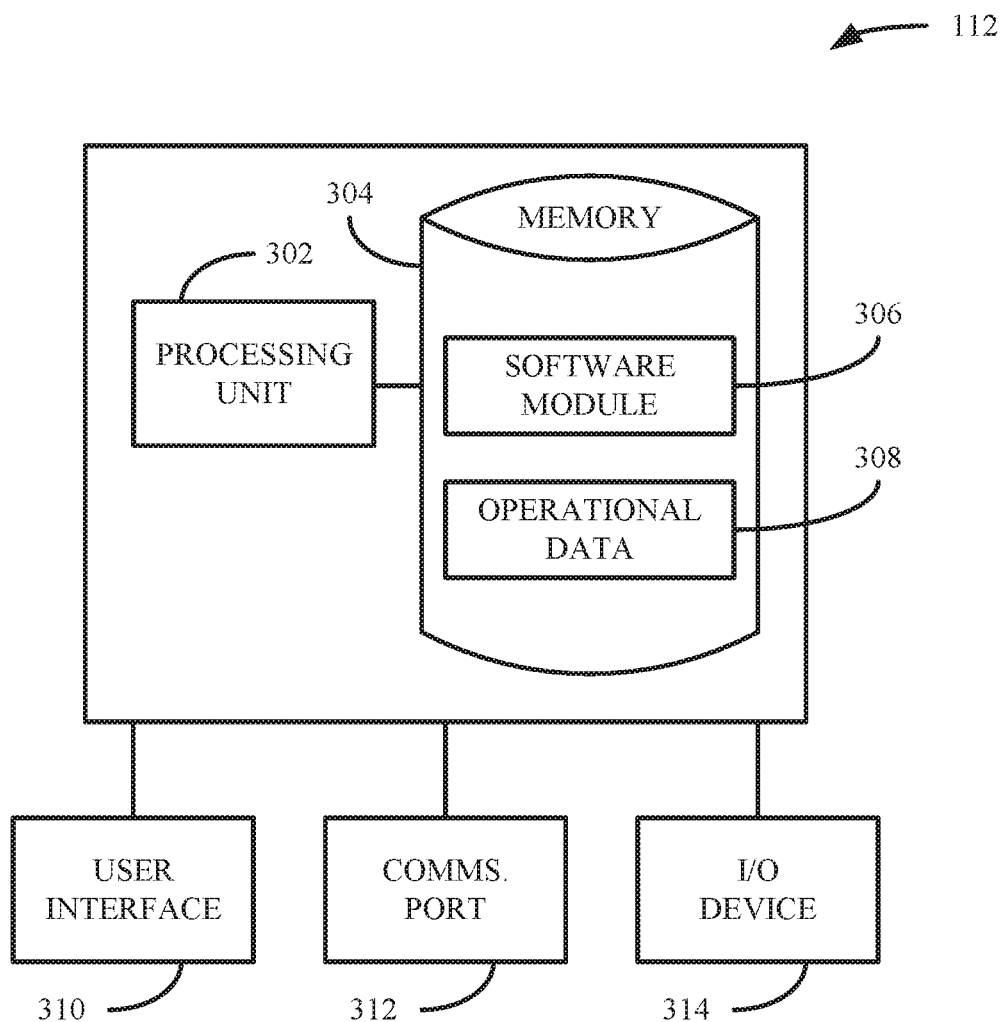
FIG. 3 shows an example schematic of a controller consistent with this disclosure.

FIG. 3 shows an example schematic of controller 112 consistent with embodiments disclosed herein. As shown in FIG. 3, controller 112 may include a processing unit 302 and a memory 304. Memory 304 may include a software module 306 and operational data 308. While executing on processing unit 302, software module 304 may perform processes for active inlet turbine control, including, for example, one or more stages included in a method 400 described below with respect to FIG. 4. Controller 112 may also include a user interface 310, a communications port 312, and an input/output (I/O) device 314.

As disclosed herein, operational data 308 may include data regarding temperature profiles and the operation of turbine 102. For example, operational data 308 may include desired air temperatures for air 122 entering compressor bell mouth 104 for given ambient temperatures. As a result, controller 112 may receive ambient temperature data from one of sensors 118 and adjust the amount of heated air injected into inlet duct 108 accordingly. Other data that may be included in operational data 308 may include oxygen content of air 122, humidity parameters, etc.

User interface 310 can include any number of devices that allow a user to interface with controller 310. Non-limiting examples of user interface 310 include a keypad, a microphone, a display (touchscreen or otherwise), etc.

Communications port 312 may allow controller 112 to communicate with various information sources and devices, such as, but not limited to, remote energy management systems used by utility companies to determine when turbine 102 may be needed to meet current electricity demands, other turbines located at a power plant, etc. Non-limiting examples of communications port 312 include, Ethernet cards (wireless or wired), Bluetooth® transmitters and receivers, near-field communications modules, etc. In addition, controller 112 may include more than one communications port 312.

I/O device 314 may allow controller 112 to receive and output information. For example, I/O device 314 may include controller 112 to receive signals from sensors 118 as well as transmit activation signals to modulating valves 114. Non-limiting examples of I/O device 314 include, sensors 118 and modulating valves 114, etc.

Figure 4:
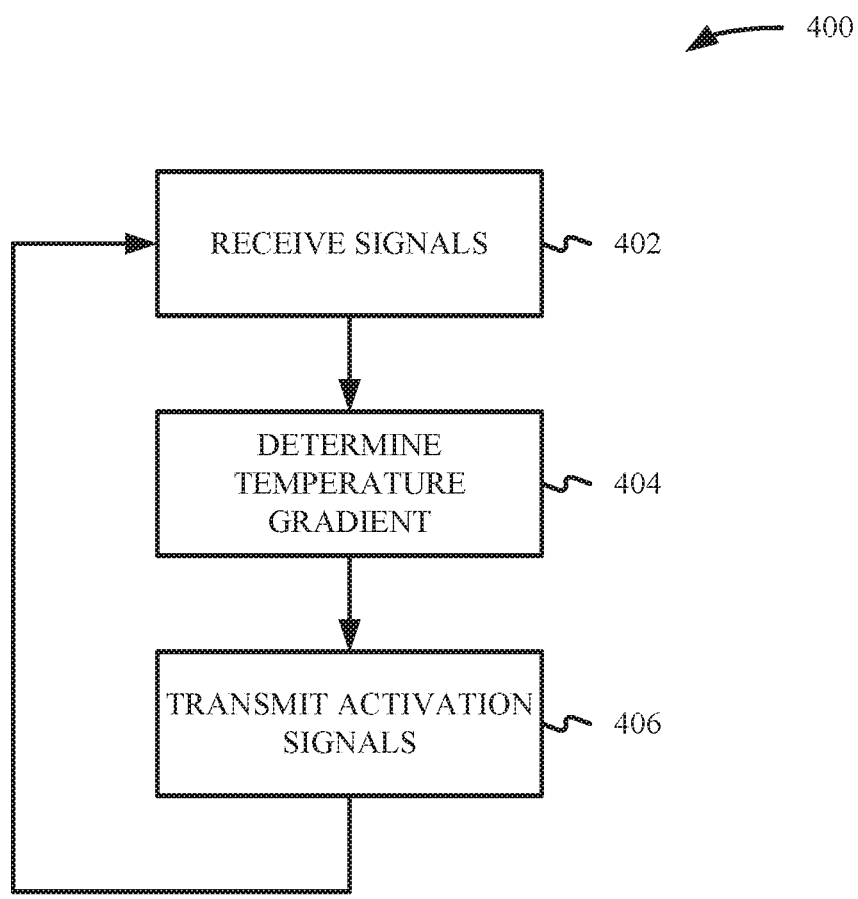
FIG. 4 shows an example method consistent with this disclosure.

FIG. 4 shows method 400 for active inlet turbine control consistent with this disclosure. Method 400 may begin at stage 402 where controller 112 may receive a plurality of signals. For example, as disclosed herein, sensors 118 and/or infrared camera 120 may transmit signals to controller 112. The signals transmitted by sensors 118 and/or infrared camera 120 may correspond to a temperature proximate an inlet of system 100, such as near compressor bell mouth opening 104.

From stage 402 method 400 may proceed to stage 404 where a temperature gradient may be determined. For instance, using the received signals, controller 112 may determine a temperature gradient proximate the inlet of turbine 102 or at some other location within inlet duct 108. As disclosed herein, temperature gradients may be determined at more than one location within inlet duct 108.

From stage 404 method 400 may proceed to stage 406 where activation signals may be transmitted. For example, upon a determination that a temperature gradient exists or exceeds a preset value, controller 112 may transmit activation signals to one or more of modulating valves 114. The activation signals may open or close one or more of modulating valves 114 so as to increase or decrease the amount of bypass bleed air being injected into air 122 prior to air 122 entering compressor bell mouth 104.

EXAMPLES

Example 1 is a method of controlling a turbine, the method comprising: receiving, at a controller comprising a processor, a plurality of signals, each of the plurality of signals corresponding to a temperature measured by one of a plurality of sensors located proximate an inlet of the turbine; determining, by the controller, a temperature gradient across the inlet of the turbine based on the plurality of signals; and transmitting, by the controller, an activation signal to a modulating valve, the activation signal operative to open or close the modulating valve based on the temperature gradient.

In Example 2, the subject matter of Example 1 optionally includes wherein transmitting the activation signal to the modulating valve includes transmitting the activation signal to one of a plurality of modulation valves.

In Example 3, the subject matter of Example 2 optionally includes wherein each of the plurality of modulation valves is associated with a corresponding one of the plurality of sensors.

In Example 4, the subject matter of any one or more of Examples 1-3 optionally include wherein transmitting the activation signal to the modulating valve includes opening the modulating valve in response to the temperature gradient exceeding a preset value.

In Example 5, the subject matter of any one or more of Examples 1-4 optionally include wherein transmitting the activation signal to the modulating valve include closing the modulating valve in response to the temperature gradient being below a preset value.

Example 6 is a system of controlling a turbine, the system comprising: a processor; and a memory storing instructions that, when executed by the processor, cause the processor to: receive a plurality of signals, each of the plurality of signals corresponding to a temperature measured by one of a plurality of sensors located proximate an inlet of the turbine, determine a temperature gradient across the inlet of the turbine based on the plurality of signals, and transmit an activation signal to a modulating valve, the activation signal operative to open or close the modulating valve based on the temperature gradient.

In Example 7, the subject matter of Example 6 optionally includes transmitting the activation signal to the modulating valve includes instruction that, when executed by the processor, cause the processor to transmit the activation signal to one of a plurality of modulation valves.

In Example 8, the subject matter of Example 7 optionally includes wherein each of the plurality of modulation valves is associated with a corresponding one of the plurality of sensors.

In Example 9, the subject matter of any one or more of Examples 6-8 optionally include wherein transmitting the activation signal to the modulating valve includes instruction that, when executed by the processor; cause the processor to open the modulating valve in response to the temperature gradient exceeding a preset value.

In Example 10, the subject matter of any one or more of Examples 6-9 optionally include wherein transmitting the activation signal to the modulating valve include instruction that, when executed by the processor, cause the processor to close the modulating valve in response to the temperature gradient being below a preset value.

Example 11 is a turbine comprising: an inlet duct defining an inlet in fluid communication with a compressor section of the turbine; a sensor arranged to measure a temperature gradient across the inlet; a compressor bleed valve in fluid communication with the compressor section of the turbine; a plurality of nozzles in fluid communication with the compressor bleed valve, the plurality of nozzles arranged to inject hot air from the compressor section of the turbine into the inlet duct.

In Example 12, the subject matter of Example 11 optionally includes wherein the sensor is one of a plurality of sensors.

In Example 13, the subject matter of Example 12 optionally includes wherein the plurality of sensors for a grid.

In Example 14, the subject matter of Example 13 optionally includes wherein a shape of the grid matches a shape of the inlet.

In Example 15, the subject matter of any one or more of Examples 13-14 optionally include wherein the grid is an Cartesian grid.

In Example 16, the subject matter of any one or more of Examples 13-15 optionally include wherein the grid is a polar grid.

In Example 17, the subject matter of any one or more of Examples 12-16 optionally include wherein each of the plurality of sensors corresponds to one of the plurality of nozzles.

In Example 18, the subject matter of any one or more of Examples 12-17 optionally include wherein the plurality of sensors that are arranged within the inlet.

In Example 19, the subject matter of any one or more of Examples 12-18 optionally include a plurality of valves, each of the plurality of valves associated with at least one of the plurality of nozzles; a processor electrically coupled to the plurality of sensors and the plurality of valves; and a memory storing instructions that, when executed by the processor, cause the processor to: continuously receive a plurality of signals from the plurality of sensors, each of the plurality of signals corresponding to a temperature within the inlet measured by one of a plurality of sensors, determine a temperature gradient across the inlet of the turbine based on the plurality of signals, and transmit an activation signal to at least one of the plurality of valves, the activation signal operative to open or close the at least one of the plurality of valves based on the temperature gradient.

In Example 20, the subject matter of any one or more of Examples 11-19 optionally include wherein the sensor is an infrared camera arranged to view the inlet.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method of reducing a gradient of an inlet composition parameter of a gas turbine engine, the method comprising: receiving, at a controller comprising a processor, a plurality of signals, each of the plurality of signals corresponding to an inlet composition parameter measured by one of a plurality of sensors located proximate an inlet of the gas turbine engine; determining, by the controller, the gradient of the inlet composition parameter across the inlet of the gas turbine engine based on the plurality of signals; transmitting, by the controller, an activation signal to a modulating valve, the activation signal operative to open or close the modulating valve based on the inlet composition parameter; and gradient opening or closing the modulating valve via the activation signal.

2. The method of claim 1, wherein transmitting the activation signal to the modulating valve includes transmitting the activation signal to one of a plurality of modulation valves.

3. The method of claim 2, wherein each of the plurality of modulation valves is associated with a corresponding one of the plurality of sensors.

4. The method of claim 1, wherein transmitting the activation signal to the modulating valve includes opening the modulating valve in response to the gradient of the inlet composition parameter exceeding a preset value.

5. The method of claim 1, wherein transmitting the activation signal to the modulating valve include closing the modulating valve in response to the gradient of the inlet composition parameter being below a preset value.

6. A system of reducing a gradient of an inlet composition parameter, the system comprising:
a processor; and
a memory storing instructions that, when executed by the processor, cause the processor to:
receive a plurality of signals, each of the plurality of signals corresponding to a temperature measured by one of a plurality of sensors located proximate an inlet of the gas turbine engine,
determine a temperature gradient across the inlet of the gas turbine engine based on the plurality of signals, and
activate a modulating valve via an activation signal transmitted to the modulating valve, the activation signal operative to open or close the modulating valve based on the temperature gradient.

7. The system of claim 6, transmitting the activation signal to the modulating valve includes instruction that, when executed by the processor, cause the processor to transmit the activation signal to one of a plurality of modulation valves.

8. The system of claim 7, wherein each of the plurality of modulation valves is associated with a corresponding one of the plurality of sensors.

9. The system of claim 6, wherein transmitting the activation signal to the modulating valve includes instruction that, when executed by the processor, cause the processor to open the modulating valve in response to the temperature gradient exceeding a preset value.

10. A system of reducing a gradient of an inlet composition parameter of a gas turbine engine, the system comprising: a processor; and a memory storing instructions that, when executed by the processor, cause the processor to: receive a plurality of signals, each of the plurality of signals corresponding to a temperature measured by one of a plurality of sensors located proximate an inlet of the gas turbine engine, determine a temperature gradient across the inlet of the gas turbine engine based on the plurality of signals, and activate a modulating valve via transmit an activation signal transmitted to the modulating valve, the activation signal operative to open or close the modulating valve based on the temperature gradient.

11. A system of reducing a gradient of an inlet composition parameter of a gas turbine engine, the system comprising: a processor; and a memory storing instructions that, when executed by the processor, cause the processor to: receive a plurality of signals, each of the plurality of signals corresponding to a temperature measured by one of a plurality of sensors located proximate an inlet of the gas turbine engine, determine the gradient across the inlet of the gas turbine engine based on the plurality of signals, and activate a modulating valve via an activation signal transmitted to the modulating valve, the activation signal operative to open or close the modulating valve based on the gradient.

12. The system of claim 11, transmitting the activation signal to the modulating valve includes instruction that, when executed by the processor, cause the processor to transmit the activation signal to one of a plurality of modulation valves.

13. The system of claim 12, wherein each of the plurality of modulation valves is associated with a corresponding one of the plurality of sensors.

14. The system of claim 11, wherein transmitting the activation signal to the modulating valve includes instruction that, when executed by the processor, cause the processor to open the modulating valve in response to the gradient exceeding a preset value.

15. The system of claim 11, wherein transmitting the activation signal to the modulating valve include instruction that, when executed by the processor, cause the processor to close the modulating valve in response to the gradient being below a preset value.

* * * * *